United States Patent
Jeon et al.

(10) Patent No.: US 8,874,334 B2
(45) Date of Patent: Oct. 28, 2014

(54) SHIFT CONTROL SYSTEM OF HYBRID VEHICLE WITH AUTOMATIC TRANSMISSION AND METHOD THEREOF

(75) Inventors: Byeongwook Jeon, Seoul (KR); Heeyong Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 570 days.

(21) Appl. No.: 12/947,255

(22) Filed: Nov. 16, 2010

(65) Prior Publication Data
US 2012/0029743 A1    Feb. 2, 2012

(30) Foreign Application Priority Data
Jul. 29, 2010   (KR) ................... 10-2010-0073575

(51) Int. Cl.
*G06F 19/00*    (2011.01)
(52) U.S. Cl.
USPC ............... 701/57; 701/54; 701/58; 701/79; 701/98; 701/99
(58) Field of Classification Search
USPC ........... 701/22, 54, 55, 56, 58, 59, 70, 77–80, 701/83, 98, 99, 123
See application file for complete search history.

(56) References Cited

U.S. PATENT DOCUMENTS

| | | | |
|---|---|---|---|
| 5,786,640 A | 7/1998 | Sakai et al. | |
| 5,893,895 A | 4/1999 | Ibaraki | |
| 6,092,021 A * | 7/2000 | Ehlbeck et al. | 701/123 |
| 6,553,301 B1 * | 4/2003 | Chhaya et al. | 701/54 |
| 6,925,425 B2 * | 8/2005 | Remboski et al. | 702/188 |
| 7,444,311 B2 * | 10/2008 | Engstrom et al. | 706/20 |
| 8,190,319 B2 * | 5/2012 | Syed et al. | 701/22 |
| 2007/0276582 A1 * | 11/2007 | Coughlin | 701/123 |
| 2008/0042489 A1 * | 2/2008 | Lewis et al. | 303/152 |
| 2008/0120175 A1 * | 5/2008 | Doering | 705/14 |

FOREIGN PATENT DOCUMENTS

| | | |
|---|---|---|
| JP | 7-123509 A | 5/1995 |
| JP | 7-123518 A | 5/1995 |
| JP | 8-140215 A | 5/1996 |
| JP | 8-289407 A | 11/1996 |
| JP | 10-051909 A | 2/1998 |
| JP | 2007-302055 A | 11/2007 |
| KR | 1998-018256 A | 6/1998 |
| KR | 10-0384282 B1 | 5/2003 |
| KR | 10-2005-0061792 A | 6/2005 |

* cited by examiner

*Primary Examiner* — Ronnie Mancho
(74) *Attorney, Agent, or Firm* — Morgan, Lewis & Bockius LLP

(57) ABSTRACT

A shift control system of a hybrid vehicle with an automatic transmission may include a fuzzy function calculator that receives an accel position sensor (APS) signal that may be an input variable, and outputs a severity value by determining a driver's driving severity value through a plurality of fuzzy rules including a fuzzy function for the APS signal, a sporty degree calculator that may be electrically connected with the fuzzy function calculator and determines a sporty degree corresponding to the severity value, and a mode determiner that may be electrically connected with the sporty degree calculator and determines whether an engine operates in accordance with the sporty degree.

12 Claims, 9 Drawing Sheets

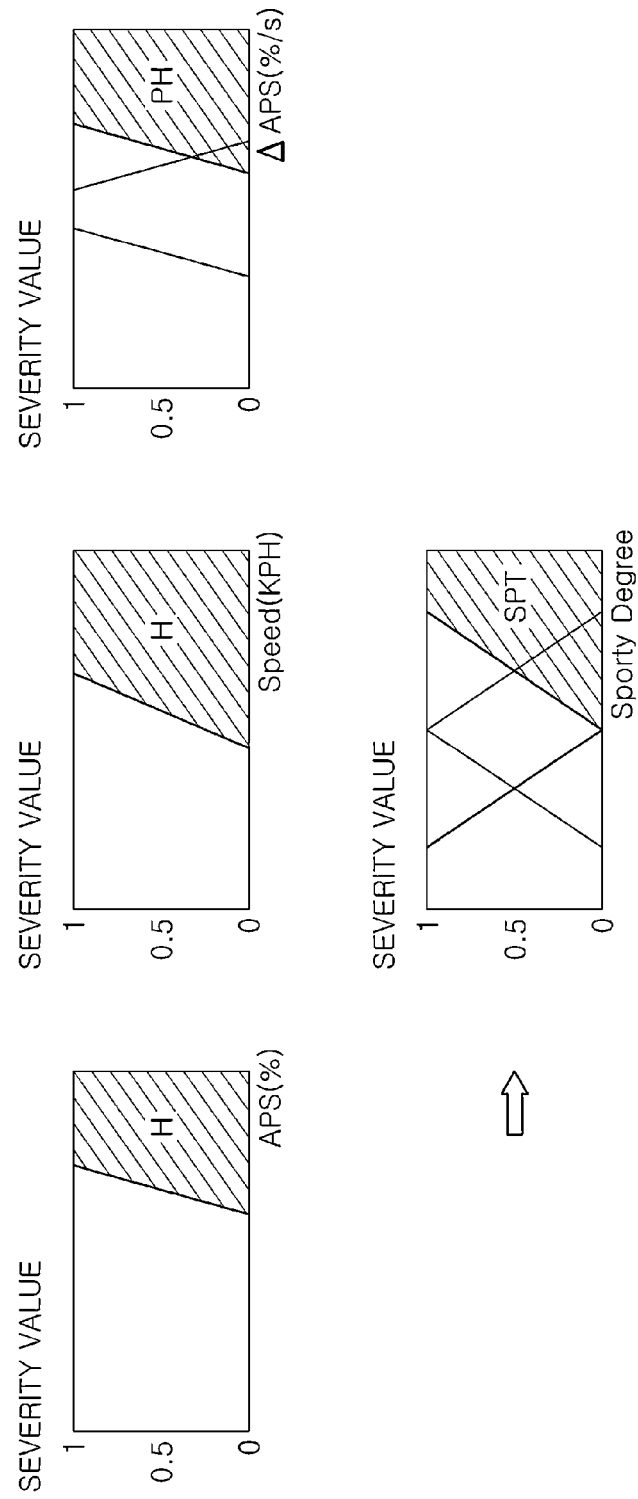

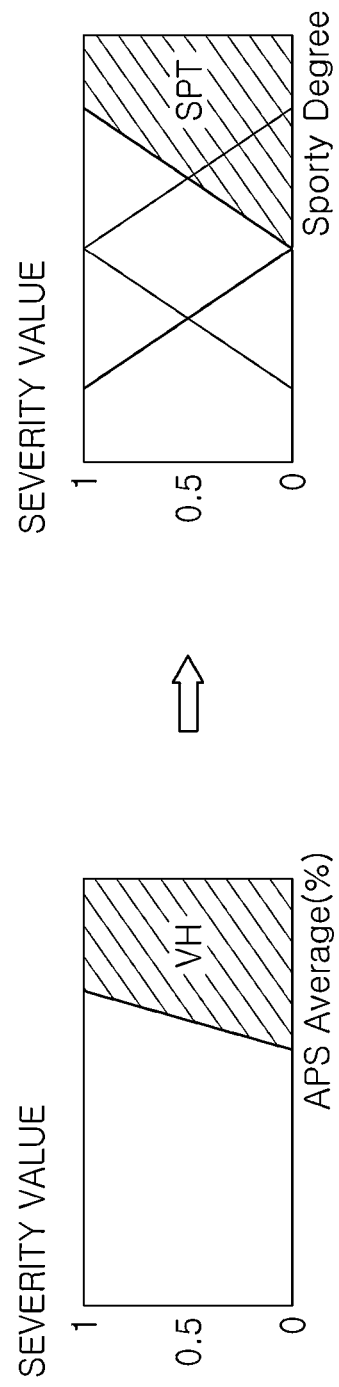

SHIFT CONTROL SYSTEM OF HYBRID VEHICLE WITH AUTOMATIC TRANSMISSION AND METHOD THEREOF

CROSS-REFERENCE TO RELATED APPLICATIONS

The present application claims priority to Korean Patent Application Number 10-2010-0073575 filed Jul. 29, 2010, the entire contents of which application is incorporated herein for all purposes by this reference.

BACKGROUND OF THE INVENTION

1. Field of the Invention

The present invention relates to a shift control system of a hybrid vehicle with an automatic transmission and a method thereof, and more particularly, to a shift control system of a hybrid vehicle with an automatic transmission that can improve acceleration feeling of the engine by driving the engine in advance before accelerating in accordance with the driver, and prevent decrease of fuel efficiency that may be caused by always driving the engine to improve the acceleration feeling, and a control method of the system.

2. Description of Related Art

In general, hybrid vehicle with an automatic transmission should perform kick down shift while driving the motor in order to perform the kick down shift in the EV (Electric Vehicle) mode in which the vehicle is driven by motors.

Since the motor has a feature that the torque decreases with the increase of the number of revolution, when the input number of revolution is increased by shifting to high stage for kick down shift, the motor torque decreases and the acceleration feeling is reduced.

In order to prevent this problem, it is possible to achieve acceleration feeling by starting the engine and engaging the engine clutch, after preventing kick down shift to implement the kick down shift through the engine. However, the vehicle is not accelerated while the engine starts and the engine clutch is engaged for the kick down shift, such that the driver does not satisfy the acceleration feeling.

Further, if the engine is continuously operated to prevent the unsatisfactory in acceleration, the fuel is wasted by continuous operation of the engine and the advantage of the fuel efficiency of the hybrid vehicles may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a shift control system of a hybrid vehicle that can ensure acceleration feeling and improve acceleration performance by starting and accelerating the engine, when the sporty degree exceeds a predetermined level by the driver's driving inclination, and a control method of the system and directed to provide a shift control system of a hybrid vehicle that can prevent fuel efficiency from deteriorated due to continuous operation of the engine for maintain the acceleration performance by keeping the engine stopped or stopping the engine, when the sporty degree according to the driver's driving inclination is less than a predetermined level, in accordance with whether the engine operates, and a control method of the system.

In an aspect of the present invention, the shift control system of a hybrid vehicle with an automatic transmission, may include a fuzzy function calculator that receives an accel position sensor (APS) signal that may be an input variable, and outputs a severity value by determining a driver's driving severity value through a plurality of fuzzy rules including a fuzzy function for the APS signal, a sporty degree calculator that may be electrically connected with the fuzzy function calculator and determines a sporty degree corresponding to the severity value, and a mode determiner that may be electrically connected with the sporty degree calculator and determines whether an engine operates in accordance with the sporty degree.

The sporty degree calculator may include a configuration that divides the severity values for the fuzzy rules by severity values for eco-, medium-, and sporty traveling states, and determines the sporty degree by using a center of weight of an area obtained by summing up the minimum value in the severity values for traveling states.

The fuzzy function calculator outputs the severity value by using a fuzzy rule including at least one of the fuzzy functions for an APS opening amount and an APS change rate, after receiving the APS opening amount and the APS change rate in the APS signal, as the input variables.

The fuzzy function calculator outputs the severity value by using a fuzzy rule including a fuzzy function for an average APS opening amount after receiving the average APS opening amount as the input variables, which may be the average of the APS opening amount after the vehicle starts, in the APS signal.

The fuzzy function calculator outputs the severity value by using a fuzzy rule including a fuzzy function for an average APS change rate, which may be the average of an APS change rate, after the vehicle starts, in the APS signal.

The fuzzy rules of the fuzzy function calculator further may include a fuzzy function for vehicle speed, other than the APS signal.

The mode determiner may include a configuration that driving the engine in advance such that shift may be performed through the engine, if shifting may be required, when the sporty degree may be above a first reference value and the vehicle speed may be above a reference vehicle speed.

In another aspect of the present invention, the control method of a shift control system of a hybrid vehicle may include determining a sporty degree by finding a driver's driving severity value on the basis of a plurality of fuzzy rules for accel position sensor (APS) signals that may be detected input variables, ascertaining whether the determined sporty degree may be larger than a first reference value, ascertaining whether a vehicle speed may be higher than a reference vehicle speed, when the sporty degree may be larger than the first reference value, and starting an engine in advance, when the vehicle speed may be higher than the reference vehicle speed.

The control method may further include stopping the engine, when the sporty degree may be less than a second reference value, by ascertaining whether the sporty degree may be less than the second reference value, while the engine starts in advance and operates.

The control method may further include keeping the engine stopped, when the sporty degree may be not larger than the first reference value or the vehicle speed may be below than the reference vehicle speed.

The determining of sporty degree determines the sporty degree on the basis of the severity value outputted from the fuzzy rule including at least one of fuzzy functions for an APS opening amount and an APS change rate, after receiving the APS opening amount and the APS change rate, as input values, in the APS signals.

The determining of sporty degree determines the sporty degree on the basis of the severity value from the fuzzy rule including a fuzzy function for an average APS opening amount, after receiving the average APS opening amount as input values, which may be the average of an APS opening amount after the vehicle starts, in the APS signals.

The determining of sporty degree determines the sporty degree by finding the severity value outputted from the fuzzy rule including a fuzzy function according to an average APS change rate, which may be the average of an APS change rate, after the vehicle starts, in the APS signals.

The determining of sporty degree determines the sporty degree by finding the severity value outputted from a fuzzy rule further including a fuzzy function for the vehicle speed, other than the APS signals.

According to the exemplary embodiment of the present invention, the shift control system of a hybrid vehicle and the control method of the shift control system can ensure acceleration feeling by accelerating the engine if acceleration may be required, and improve acceleration performance, by starting the engine in advance, when the sporty degree according to the driver's driving inclination may be higher than a predetermined level.

Further, according to the exemplary embodiment of the present invention, the shift control system of a hybrid vehicle and the control method of the shift control system can prevent fuel efficiency from the deteriorated due to continuous operation of the engine for maintain the acceleration performance by keeping the engine stopped or stopping the engine, when the sporty degree according to the driver's driving inclination may be less than a predetermined level, in accordance with whether the engine operates.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 3A to 3G are diagrams showing driving severity values to purge functions of a purge rule of the shift control system of a hybrid vehicle illustrated in FIG. 1.

Figure 1:
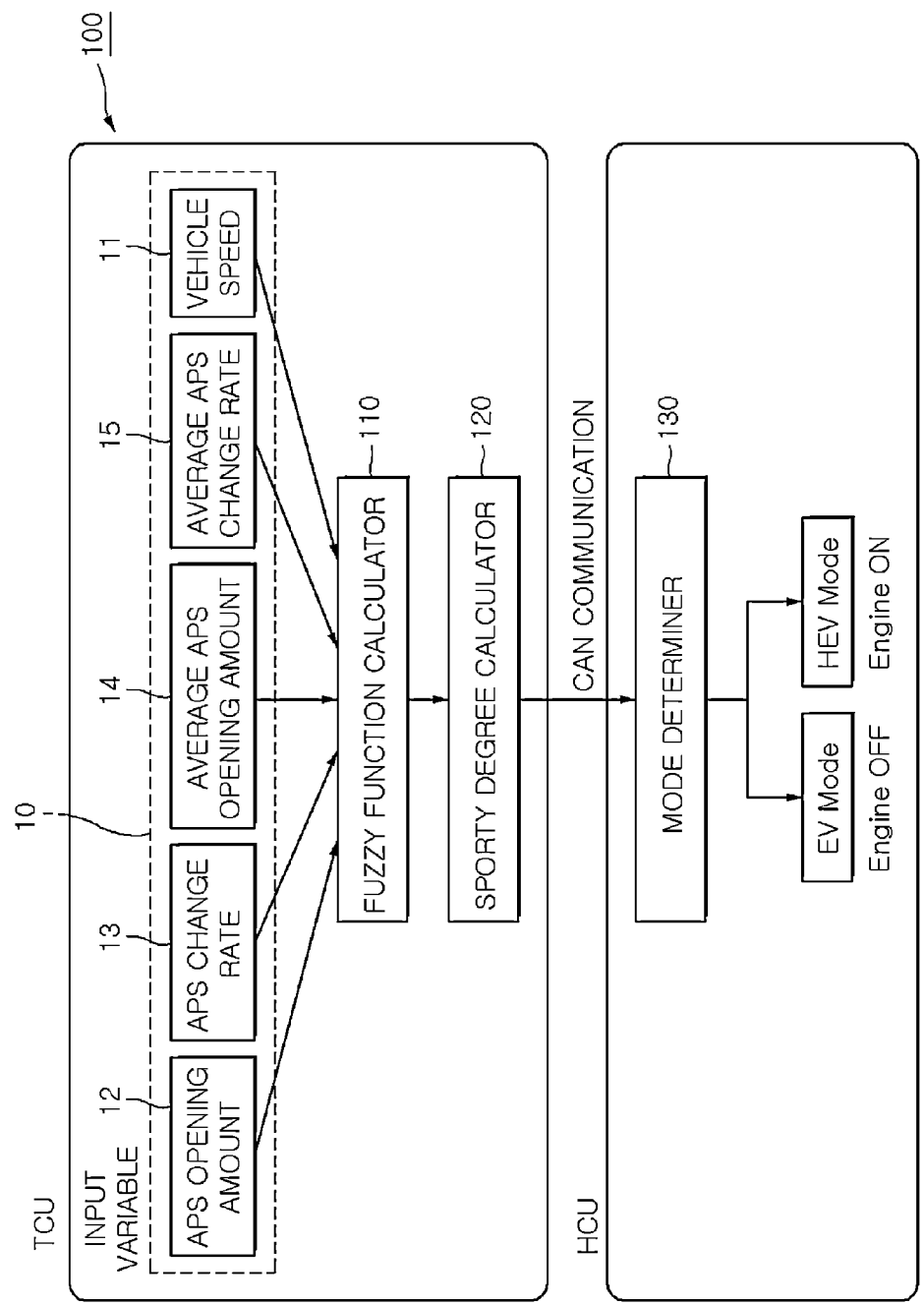
FIG. 1 is a block diagram illustrating a shift control system of a hybrid vehicle according to an exemplary embodiment of the present invention.
Figure 2:
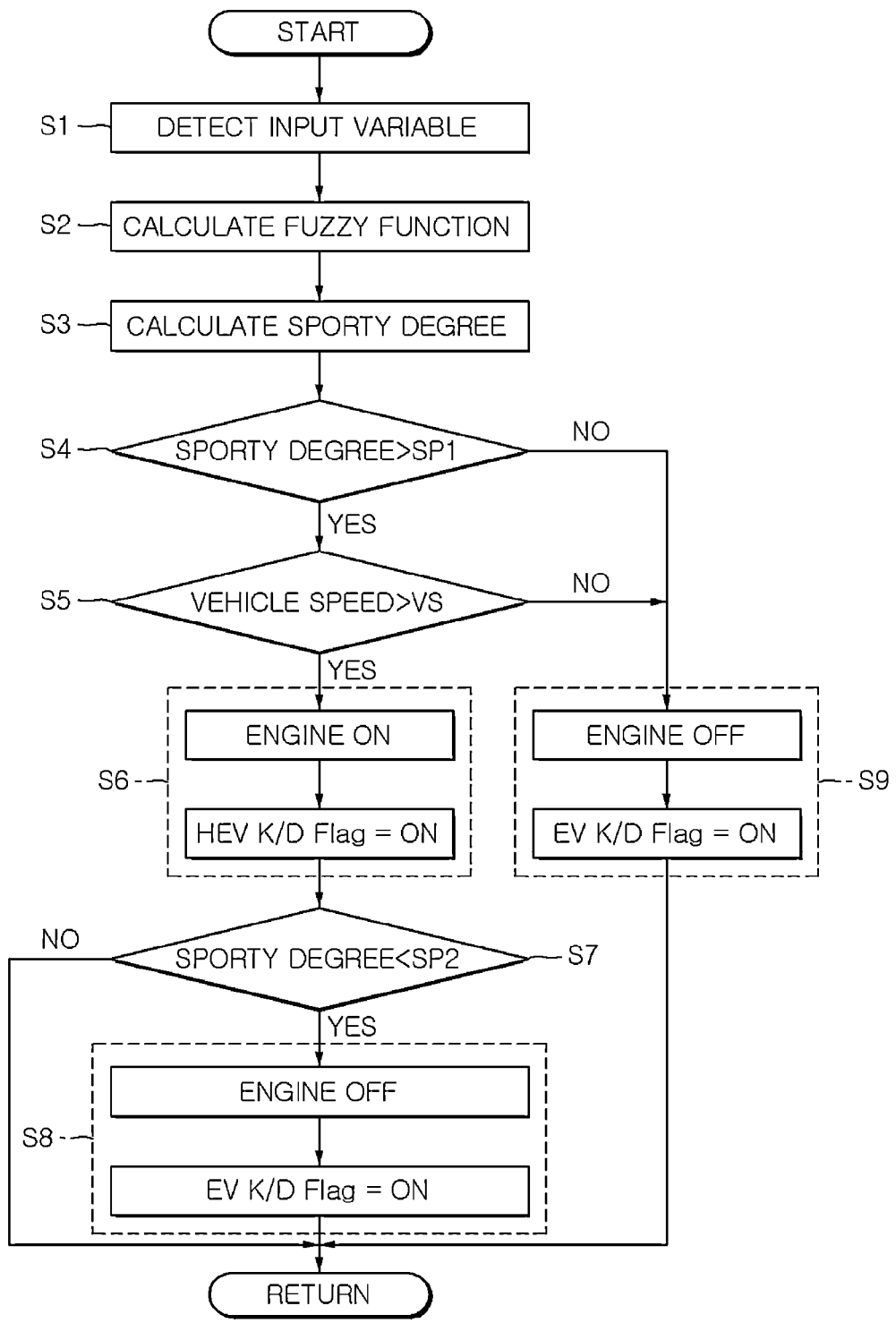
FIG. 2 is a flowchart illustrating a control method of the shift control system of a hybrid vehicle illustrated in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIG. 1, a shift control system 100 of a hybrid vehicle includes a fuzzy function calculator 110 that calculates severity values in response to APS signal that are detected input variables, a sporty degree calculator 120 that calculates sporty degrees according to the severity values, and a mode determiner 130 that determines shift driving modes in accordance with the sporty degrees. Fuzzy function calculator 110 and sporty degree calculator 120 may be included in a shift controller TCU controlling operation of the transmission and mode determiner 130 may be included in an integral controller HCU controlling operation of controllers in the vehicle.

First, accel position sensor (hereafter, referred to as "APS") signal are detected as input variables 10 to perform the control method of a shift control system of a hybrid vehicle (S1).

The APS signal includes the APS opening amount 12 sensed by an APS, an APS change rate 13 that is the change rate of the sensed APS opening amount 12 to time, an average APS opening amount 14 after the vehicle starts for checking the driver's inclination, and an average APS change rate 15 after the vehicle starts.

Further, vehicle speed 11 sensed by a speed sensor, other than the APS signal, is detected as the input variables 10 (S1).

Further, fuzzy function calculator 110 receives APS signal that is detected input variables 10 and calculates a fuzzy function to calculate the driving severity value according to the fuzzy rule.

Further, fuzzy function calculator 110 calculates the driver's driving severity values through a plurality of fuzzy rules including the fuzzy function according to the APS signal. The driving severity values are values for estimating whether the driver drives the vehicle in a medium traveling state or a sporty traveling state.

Further, the fuzzy rules may be divided into a plurality of fuzzy rules by the fuzzy function according to APS signal conditions. The fuzzy rules each include at least one fuzzy function in the fuzzy functions to APS opening amount 12, APS change rate 13, average APS opening amount 14, and average APS change rate 15. Further, the fuzzy rules further include a fuzzy function to the vehicle speed, other than the APS signal.

Further, the fuzzy rules may further include fuzzy function for brake operation, shift lever operation, and handling state and the conditions of the fuzzy rules are not limited to the APS signal and the vehicle speed in an exemplary embodiment of the present invention.

Embodiments of fuzzy function conditions having the APS signal and the vehicle speed and the fuzzy rules including them are described hereafter. Fuzzy function calculator 110 may further include a plurality of fuzzy rules having combination of the fuzzy functions for the vehicle speed and the APS signal, other than the following embodiment.

Figure 3A:
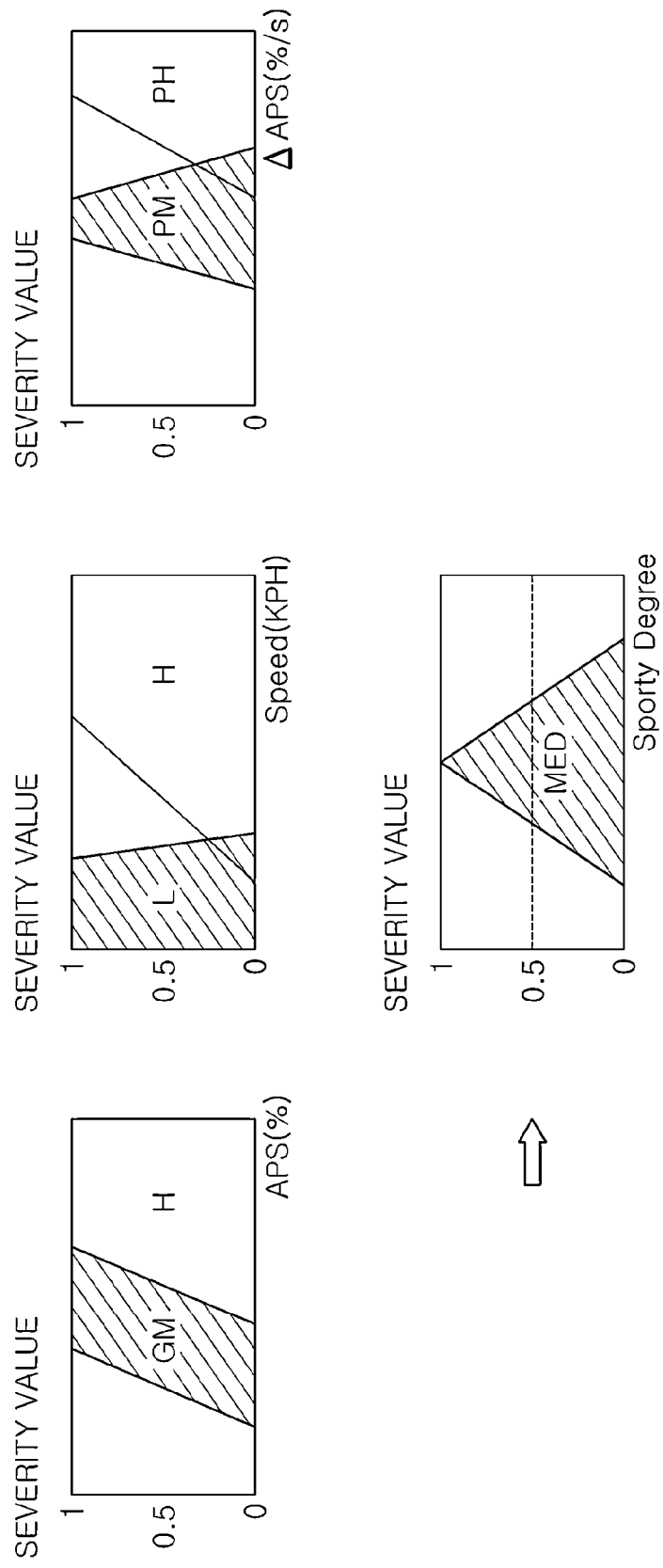

In the fuzzy rules, the first fuzzy rule shown in FIG. 3A is a fuzzy rule for determining the medium traveling when MTI (Middle tip-in) acceleration is performed at a low speed, includes the fuzzy functions for the vehicle speed 11, APS opening amount 12, APS change rate 13, which are the input variables, and calculates the severity value for the medium travelling which is the traveling severity value satisfying the fuzzy functions.

The first fuzzy rule shown in FIG. 3A determines that it is the medium traveling MED, when APS opening amount 12 is included in the middle range GM, vehicle speed 11 is included in a low speed range L and APS change rate 13 to time is included in the middle increase rate PM.

The fuzzy function for vehicle speed 11 outputs the calculated value in accordance with whether vehicle speed 11, one of input variables 10, is included in the low speed range L, on the basis of predetermined upper and lower limits.

Further, the fuzzy function for APS opening amount 12 outputs the calculated result in accordance with whether APS opening amount 12, one of input variables 10, is included in the middle range GM, on the basis of the lower and upper limits to the minimum value and the maximum value.

Further, the fuzzy function for APS change rate 13 outputs the calculated result in accordance with whether APS change rate 13, one of input variables 10, is included in the middle increase rate GM, on the basis of the lower and upper limits to the minimum value and the maximum value.

The upper and lower limits for limiting the range of the fuzzy functions may depend on the vehicles.

Further, the fuzzy function for the vehicle speed and the APS signal shows the vehicle speed and APS signal, which are the input of the fuzzy function, on the x-axis and the calculated results on the y-axis. The calculated results of the fuzzy functions are a value between 0 and 1 set on the y-axis in accordance with input variables 10.

For example, when it is included in the middle value GM of the fuzzy function for APS opening amount 12 and has the corresponding calculated result, 0.7, included in the low speed range L of the fuzzy function for vehicle speed 11 and has the corresponding calculated result, 0.5, and included in the middle increase rate range PM of APS change rate 13 and has the corresponding calculated result, 0.8, the medium traveling MED is determined.

Further, the severity value for the medium traveling MED is outputted as 5, which is the minimum value in the calculated result of the fuzzy function for APS opening amount 12, the calculated result of the fuzzy function for vehicle speed 11, and the calculated value of APS change rate 13. That is, when the input variables 10 are included in the conditional range of the fuzzy functions, the severity value is the same value as the minimum result in the calculated results of the fuzzy functions. Therefore, the severity value is one of the values between 0 and 1, which is the range set by the calculated results of the fuzzy functions.

Further, the severity value for the medium traveling MED of the first fuzzy rule is not outputted, because it is determined it is not the medium traveling MED, when the input variables fail to satisfy even one of the fuzzy function conditions of the fuzzy rule.

Figure 3B:
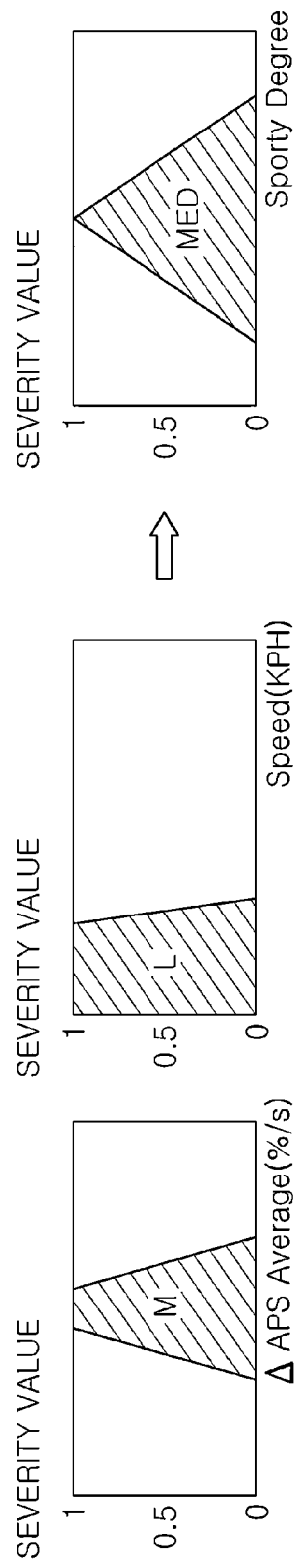

Further, in the fuzzy rules, the second fuzzy rule shown in FIG. 3B is a fuzzy rule for determining that it is the medium traveling when the tip-in/out operation is in the middle range under the low speed condition, includes fuzzy functions for average APS change rate 15 and vehicle speed 11, and outputs the driving severity value when the fuzzy functions are satisfied.

The second fuzzy rule shown in FIG. 3B determines that it is the medium traveling MED, when average change rate 15 is included in the middle increase rate PM and vehicle speed 11 is included in the low speed range L. Average APS change rate 15 is a variable for checking the driver's inclination for a long period of time and the average value to changes in APS opening amount which are measured at regular intervals after the vehicle starts.

The fuzzy function for average APS change rate 15 outputs the calculated result in accordance with whether APS change rate 15, one of input variables 10, is included in the middle increase rate GM, on the basis of the lower and upper limits to the minimum value and the maximum value.

Further, the fuzzy function for vehicle speed 11 may by applied in the same way as the fuzzy function for the vehicle speed of the first fuzzy rule.

Further, the same value as the minimum value in the calculated results of the fuzzy functions is outputted as the severity value in the medium traveling MED, when average APS change rate 15 is in the middle increase rate PM and vehicle speed 11 is in the low speed range L.

Further, the severity value for the medium traveling MED of the second fuzzy rule is not outputted, because it is determined it is not the medium traveling MED, when the input variables fail to satisfy even on of the fuzzy function conditions of the fuzzy rule.

Figure 3C:
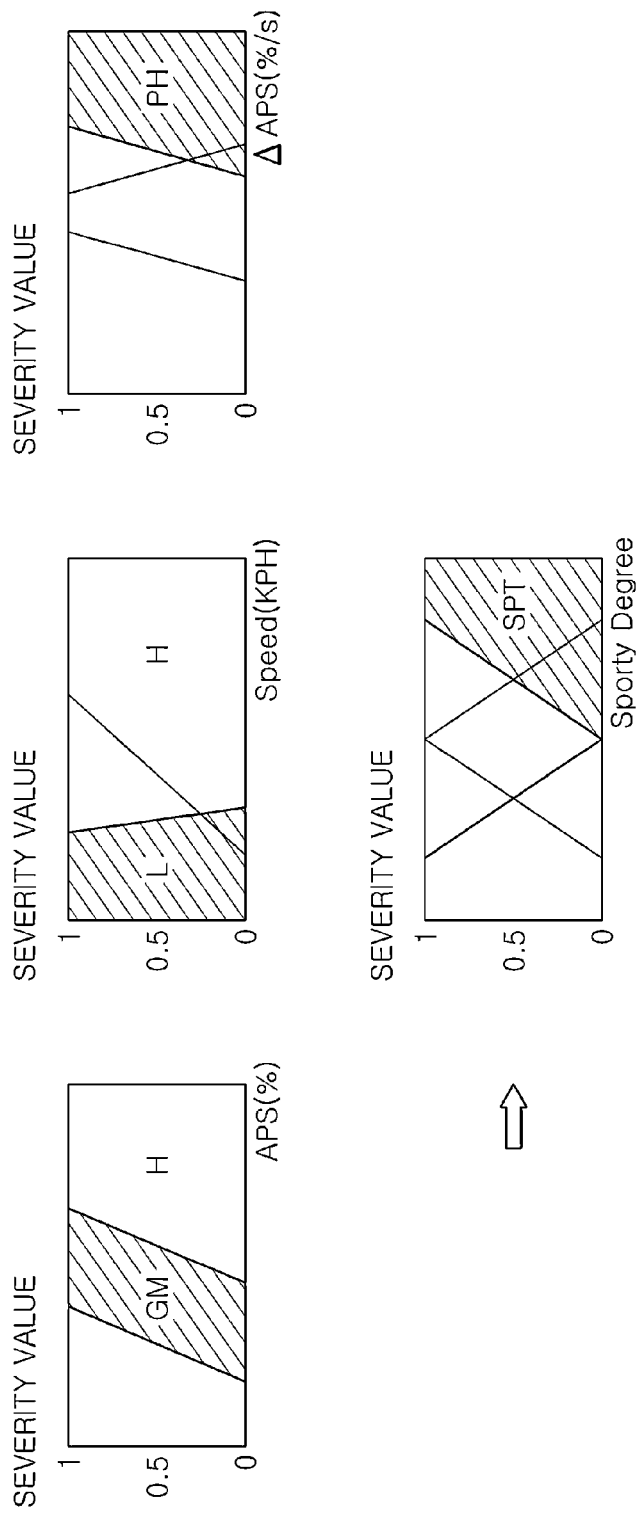

Further, in the fuzzy rules, the third fuzzy rule shown in FIG. 3C is a fuzzy rule for determining that it is the sporty traveling when a tip-in sudden operation occurs under the low speed condition, includes fuzzy functions for vehicle speed 11, APS opening amount 12, and APS change rate 13 to time, and outputs the driving severity value when the fuzzy functions are satisfied.

The third fuzzy rule shown in FIG. 3C determines that it is sporty traveling (SPT) in which the tip-in sudden operation occurs under the low speed condition, when APS opening amount 12 is included in the middle range GM, vehicle speed 11 is included in a low speed range L and APS change rate 13 to time is included in high change rate range PH.

The fuzzy function for APS change rate 13 outputs the calculated value in accordance with whether APS change rate 13, one of input variables 10, is included in the high change rate range PH, on the basis of the upper and lower limits. Further, the fuzzy functions for vehicle speed 11 and APS opening amount 12 outputs calculated results in the same ways as in the fuzzy functions for the low speed range L and the middle range GM of the first fuzzy rule.

Further, the same value as the minimum value in the calculated results of the fuzzy functions is outputted as the severity value in the sporty traveling SPT, when APS change rate 13 to time is in the high increase rate PH, vehicle speed 11 is in the low speed range L, and APS opening amount 12 is in the middle range GM.

Further, the severity value for the sporty traveling SPT of the third fuzzy rule is not outputted, because it is determined it is not the sporty traveling SPT, when the input variables fail to satisfy even one of the fuzzy function conditions of the third fuzzy rule.

Further, in the fuzzy rules, the fourth fuzzy rule shown in FIG. 3D is a fuzzy rule for determining that it is the sporty traveling when a tip-in sudden operation occurs under the high speed condition, includes fuzzy functions for vehicle speed 11, APS opening amount 12, and APS change rate 13, and outputs the driving severity value when the fuzzy functions are satisfied.

The fourth fuzzy rule shown in FIG. 3D determines that it is sporty traveling SPT in which the tip-in sudden operation occurs under the high speed condition, when APS opening amount 12 is included in the high range HIGH, vehicle speed 11 is included in a high speed range HIGH and APS change rate 13 to time is included in a positive high range PH.

The fuzzy functions for vehicle speed 11, APS opening amount 12, and APS change rate 13 may be applied in the same way as the fuzzy functions corresponding to the conditions of the first fuzzy rule to the third fuzzy rule.

Further, the same value as the minimum value in the calculated results of the fuzzy functions is outputted as the severity value in the sporty traveling SPT, when vehicle speed 11 is in the high range H, APS opening amount 12 is in high range H, and APS change rate 13 is in the high increase rate PH.

Further, in the fuzzy rules, the fifth fuzzy rule shown in FIG. 3E is a fuzzy rule for determining that it is a sport traveling when HTI (Heavy tip-in) acceleration is performed for a long period of time, includes a fuzzy function for average APS opening amount 14, and outputs the driving severity value when the fuzzy function is satisfied.

Further, the severity value for the sporty traveling SPT of the fourth fuzzy rule is not outputted, because it is determined it is not the sporty traveling SPT, when the input variables fail to satisfy even one of the fuzzy function conditions of the fourth fuzzy rule.

The fifth fuzzy rule shown in FIG. 3E determines that it is the sporty traveling SPT on the basis of the long-time HTI acceleration, regardless of the speed, when average APS opening amount 14 is in a very high range VH.

Average APS opening amount 14 is a variable for checking the driver's inclination for a long period of time and the average value of the values obtained by measuring the APS opening amount at regular intervals after the vehicle starts. Further, the fuzzy function for average APS opening amount 14 outputs a calculated result in accordance with whether average APS opening 14, one of input variables 10, is included in the very high range VH, on the basis of the predetermined upper and lower limits.

When APS opening amount 14 is included in the very high range VH, the calculated result of the fuzzy function of average APS opening amount 14 is outputted as the severity value in the sporty traveling SPT.

Further, the severity value for the sporty traveling SPT of the fifth fuzzy rule is not outputted, because it is determined that it is not the sporty traveling SPT, when average APS opening amount 14 is not included in the very high range VH.

Figure 3F:
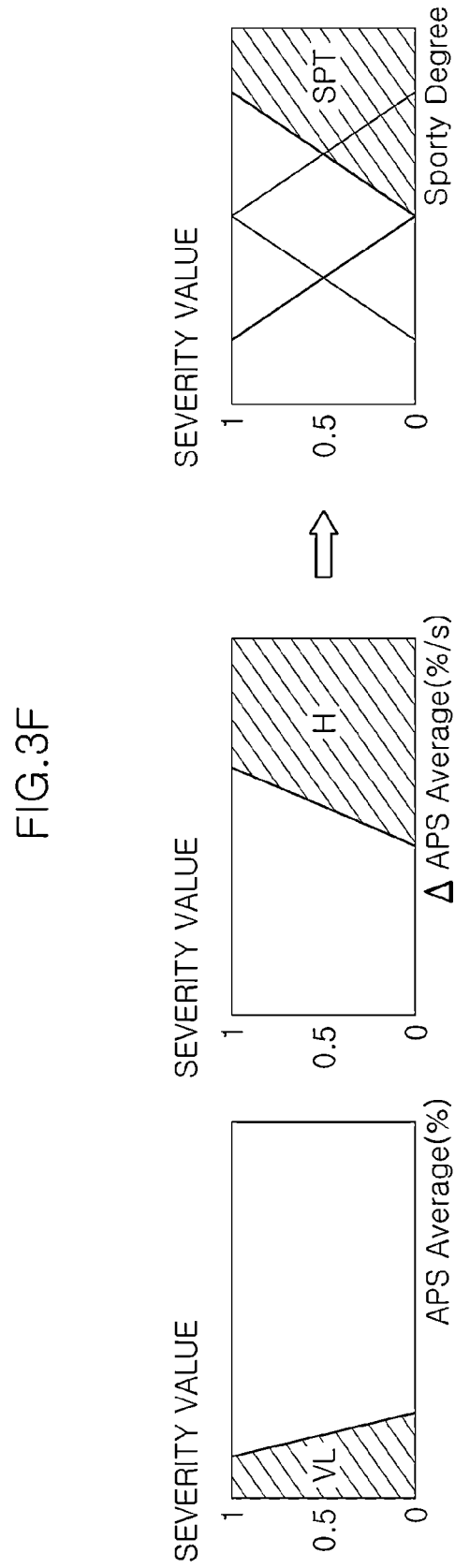

Further, in the fuzzy rules, the sixth fuzzy rule shown in FIG. 3F is a fuzzy rule for determining that it is the sport traveling SPT when LTI (Light Tip-In) acceleration is performed and the tip-in/out operation is frequently performed, includes fuzzy functions for average APS opening amount 14 and average APS change rate 15, and outputs the driving severity value when the fuzzy functions are satisfied.

The sixth fuzzy rule shown in FIG. 3F determines that the tip-in/out operation is frequently performed under the LTI acceleration and it is the sporty traveling SPT, when average APS opening amount 14 is included in very low range VL and average APS change rate 15 is included in the high increase rate PH.

The fuzzy function for average APS opening amount 14 outputs a calculated result in accordance with whether average APS opening 14, one of input variables 10, is included in the very low range VL, on the basis of the predetermined upper and lower limits. Further, the fuzzy function for average APS change rate 15 outputs the calculated value in accordance with whether average APS change rate 15, one of input variables 10, is included in the high increase rate range PH, on the basis of the upper and lower limits.

Further, the same value as the minimum value in the calculated results of the fuzzy function is outputted as the severity value in the sporty traveling SPT, when average APS opening amount 14 is included in the very low range VL and average APS change rate 15 is included in the high increase rate PH.

Further, the severity value for the sporty traveling SPT of the sixth fuzzy rule is not outputted, because it is determined it is not the sporty traveling SPT, when the input variables fail to satisfy even one of the fuzzy function conditions of the sixth fuzzy rule.

Fuzzy function calculator 1110 outputs the severity values for the fuzzy rules and inputs them into sporty degree calculator 120.

Figure 3G:
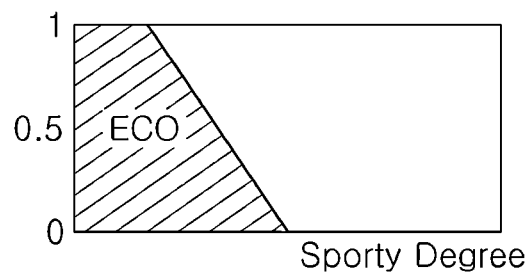

Further, fuzzy function calculator 110 outputs the severity value for an eco-mode shown in FIG. 3G as the maximum value, when the vehicle is in an ignition-on state and an idle state.

Sporty degree calculator 120 receiving the severity value outputted from fuzzy function calculator 110 calculates the sporty degree corresponding to the severity value (S3).

Sporty degree calculator 120 divides the severity values for the fuzzy functions of fuzzy function calculator 110 by the severity values in the eco-, medium, and sporty traveling states.

Further, sporty degree calculator 120 sums the areas for the minimum value in the severity values for the eco-, medium, and sporty traveling states and calculates the summed final area.

Figure 4:
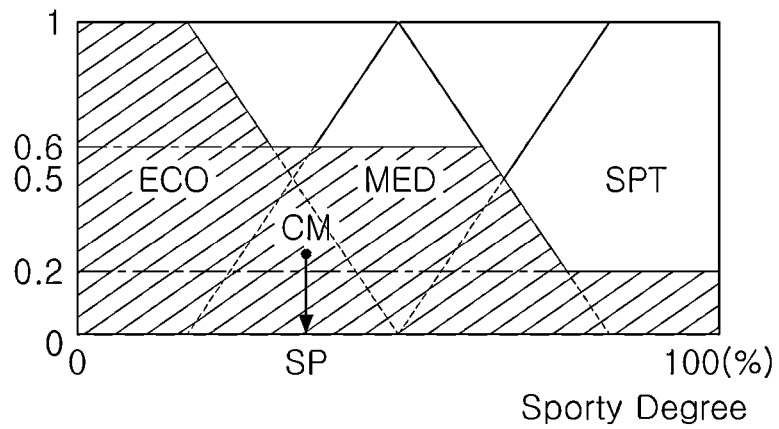
FIG. 4 is a diagram showing an example of a sporty degree map of FIG. 1.

For example, as shown in FIG. 4, when the minimum value in the severity values for the medium traveling MED outputted from the first fuzzy rule and the second fuzzy rule is 0.6 and the minimum value in the severity values for the sporty traveling SPT outputted from the third fuzzy rule to the sixth fuzzy rule is 0.2, the final area becomes the final area obtained by summing up the area for the severity value 1 for the eco-mode, the severity value 0.6 for the medium traveling MED, and the severity value 0.2 for the sporty starveling SPT.

The area for each traveling state is the area of the region when the y-axis value is under the severity value in the sporty degree maps for the traveling states. That is, the minimum value in the severity values for the traveling states is on the y-axis for the final area, and the x-axis shows the sporty degree.

Further, sporty degree calculator 120 outputs the x-axis value of the center of weight CM of the calculated final area as the sporty degree value.

Sporty degree calculator 120 outputs larger sporty degree, as the minimum value of the severity values for the medium MED and the sporty SPT traveling increase.

Further, the sporty degree outputted from sporty degree calculator 120 becomes a value in the range of 0 to 100%, in accordance with the severity value outputted from fuzzy function calculator 110.

Further, mode determiner 130 determines that it is an engine driving mode in which the engine is started in advance and it is an engine stop mode in which the engines is kept stopped, or stopped, in accordance with the sporty degree value outputted from sporty degree calculator 120.

Mode determiner 130 ascertains whether the sporty degree is larger than a first reference value SP1 (S4), and ascertains whether the vehicle speed is higher than a reference vehicle speed VS when the sporty degree is larger than the first reference value SP1 (S5). The first reference value SP1 may be set at 70% and the reference vehicle speed VS may be set at 40 KPH.

Mode determiner 130 performs the engine driving mode for starting the engine in advance, when the sporty degree is larger than the first reference value SP1 and the vehicle speed is larger than the reference vehicle speed VS (S6).

Since mode determiner 130 performs the engine driving mode by starting the engine, when the sporty degree is larger than the first reference value SP1 and the vehicle speed is larger than the reference vehicle speed VS, it is possible to perform the kick down shift through the engine if acceleration is needed, such that it is possible to ensure acceleration feeling.

Further, mode determiner 130 determines that sudden acceleration is not performed, when the sporty degree is below the first reference value SP1 or the vehicle speed is below the reference vehicle speed VS, such that it keeps the engine stopped in order to prevent unnecessary fuel consumption due to the operation of the engine (S9).

Further, mode determiner 130 converts the mode into the engine stop mode for preventing unnecessary fuel consumption due to the operation of the engine, by stopping the engine, when the sporty degree of the vehicle driven in the engine driving mode is smaller than a second reference value SP2 (S8). The second reference value SP2 may be set at 40%.

That is, mode determiner 130 can improve the acceleration performance of the vehicle for a short time by accelerating the engine that is in operation, if shifting is required, by driving the engine in advance, when the sporty mode is larger than 70% in the engine stop mode in which the engine is stopped, and can reduce fuel consumption due to the operation of the engine to improve the acceleration performance by stopping the engine, when the sporty degree is less than 40% in the engine driving mode.

The shift control system of a hybrid vehicle described above can improve the acceleration performance by easily adjusting the kick down operation through the engine acceleration, if needed, and ensuring acceleration feeling for a short time, by starting the engine in advance, when the sporty degree according to the driver's driving inclination is larger than a predetermined level, such that it is possible to remove dissatisfaction that the driver can have while starting the engine.

Further, the shift control system of a hybrid vehicle can prevent the fuel efficiency from being reduced by the operation of the engine, by stopping the engine, when the sporty degree according to the driver's driving inclination is less than a predetermined level, in accordance with the driving modes of the vehicle.

That is, the shift control system of a hybrid vehicle can improve the acceleration feeling and prevent the decrease of fuel efficiency by starting or stopping the engine in accordance with the driver's driving inclination.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A shift control system of a hybrid vehicle with an automatic transmission, comprising:
    a fuzzy function calculator that receives an accel position sensor (APS) signal that is an input variable, and outputs a severity value by determining a driver's driving severity value through a plurality of fuzzy rules including a fuzzy function for the APS signal;
    a sporty degree calculator that is electrically connected with the fuzzy function calculator and determines a sporty degree corresponding to the severity value; and
    a mode determiner that is electrically connected with the sporty degree calculator and determines whether an engine operates in accordance with the sporty degree;
    wherein the sporty degree calculator includes a configuration that divides the severity values for the fuzzy rules by severity values for eco-, medium, and sporty traveling states, and determines the sporty degree by using a center of an area obtained by summing up the areas for the minimum values in the severity values for eco-, medium and sporty traveling states; and
    wherein the mode determiner includes a configuration that starts the engine in advance to facilitate acceleration of the engine, if acceleration is required, when the sporty degree is above a first reference value and the vehicle speed is above a reference vehicle speed.

2. The shift control system of the hybrid vehicle as defined in claim 1, wherein the fuzzy function calculator outputs the severity value by using a fuzzy rule including at least one of the fuzzy functions for an APS opening amount and an APS change rate, after receiving the APS opening amount and the APS change rate in the APS signal, as the input variables.

3. The shift control system of the hybrid vehicle as defined in claim 2, wherein the fuzzy rules of the fuzzy function calculator further includes a fuzzy function for vehicle speed, other than the APS signal.

4. The shift control system of the hybrid vehicle as defined in claim 1, wherein the fuzzy function calculator outputs the severity value by using a fuzzy rule including a fuzzy function for an average APS opening amount after receiving the average APS opening amount as the input variables, which is the average of the APS opening amount after the vehicle starts, in the APS signal.

5. The shift control system of the hybrid vehicle as defined in claim 1, wherein the fuzzy function calculator outputs the severity value by using a fuzzy rule including a fuzzy function for an average APS change rate, which is the average of an APS change rate, after the vehicle starts, in the APS signal.

6. A control method of a shift control system of a hybrid vehicle, comprising,
    determining a sporty degree by finding a driver's driving severity value on the basis of a plurality of fuzzy rules for accel position sensor (APS) signals that are detected input variables by using a sporty degree calculator;
    ascertaining whether the determined sporty degree is larger than a first reference value by using a mode determiner;
    ascertaining whether a vehicle speed is higher than a reference vehicle speed by using the mode determiner, when the sporty degree is larger than the first reference value; and
    starting an engine in advance to facilitate acceleration of the engine by using the mode determiner, if acceleration is required, when the vehicle speed is higher than the reference vehicle speed.

7. The control method as defined in claim 6, further comprising stopping the engine, when the sporty degree is less than a second reference value, by ascertaining whether the sporty degree is less than the second reference value, while the engine starts in advance and operates.

8. The control method as defined in claim 6, further comprising keeping the engine stopped, when the sporty degree is not larger than the first reference value or the vehicle speed is below than the reference vehicle speed.

9. The control method as defined in claim 6, wherein the determining of sporty degree determines the sporty degree on the basis of the severity value outputted from the fuzzy rule including at least one of fuzzy functions for an APS opening amount and an APS change rate, after receiving the APS opening amount and the APS change rate, as input values, in the APS signals.

10. The control method as defined in claim 9, wherein the determining of sporty degree determines the sporty degree by finding the severity value outputted from a fuzzy rule further including a fuzzy function for the vehicle speed, other than the APS signals.

11. The control method as defined in claim 6, wherein the determining of sporty degree determines the sporty degree on the basis of the severity value from the fuzzy rule including a fuzzy function for an average APS opening amount, after receiving the average APS opening amount as input values, which is the average of an APS opening amount after the vehicle starts, in the APS signals.

12. The control method as defined in claim 6, wherein the determining of sporty degree determines the sporty degree by finding the severity value outputted from the fuzzy rule including a fuzzy function according to an average APS change rate, which is the average of an APS change rate, after the vehicle starts, in the APS signals.

* * * * *